J. M. KING.
INTERNAL COMBUSTION ENGINE.
APPLICATION FILED JULY 15, 1918.

1,361,072.

Patented Dec. 7, 1920.
3 SHEETS—SHEET 1.

Inventor:
Joseph Marion King

J. M. KING.
INTERNAL COMBUSTION ENGINE.
APPLICATION FILED JULY 15, 1918.
1,361,072.
Patented Dec. 7, 1920.
3 SHEETS—SHEET 2.
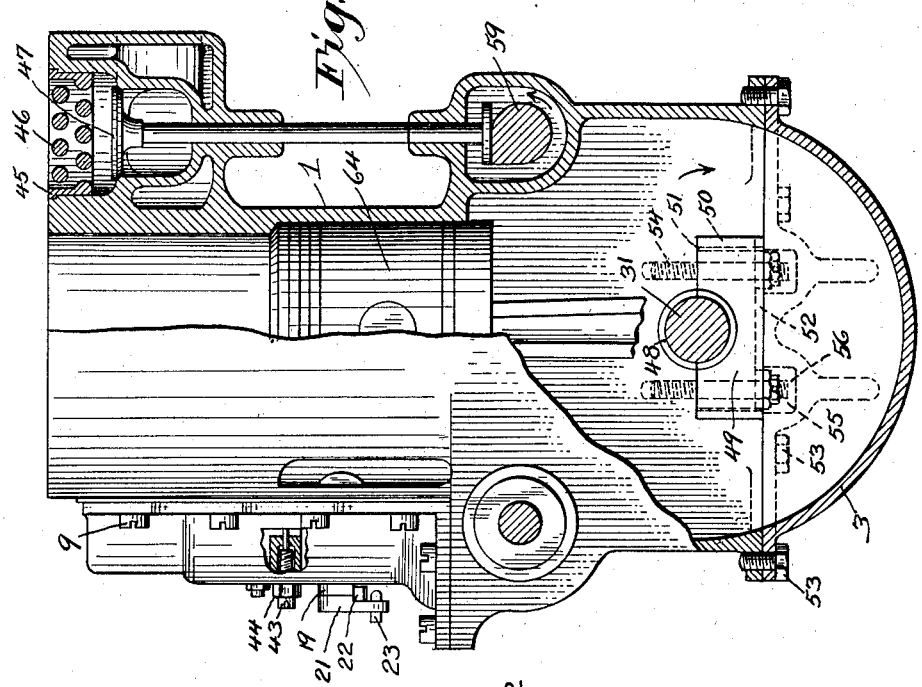
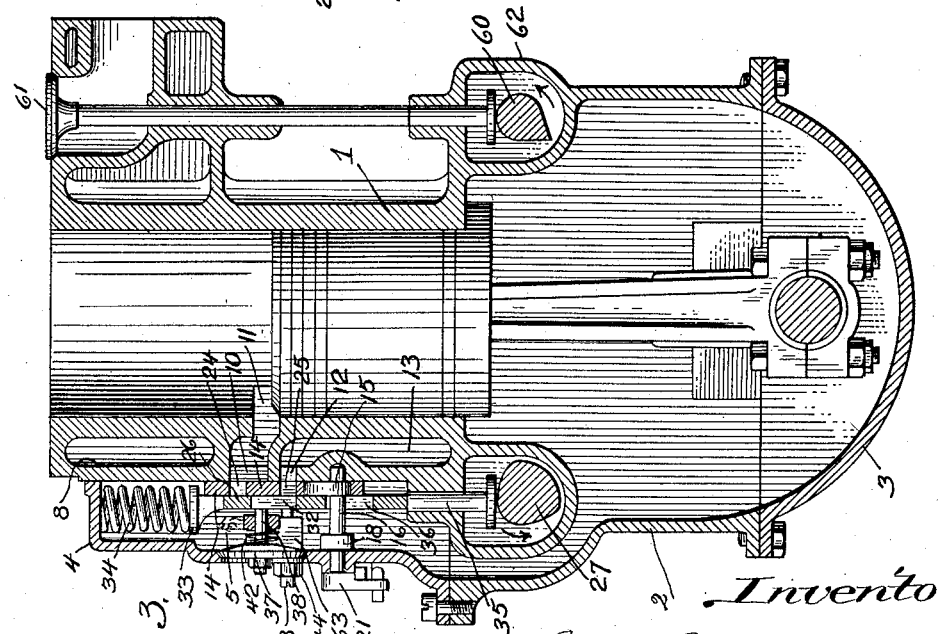
Inventor:
Joseph Marion King J. M. KING.
INTERNAL COMBUSTION ENGINE.
APPLICATION FILED JULY 15, 1918.
1,361,072.
Patented Dec. 7, 1920.
3 SHEETS—SHEET 3.
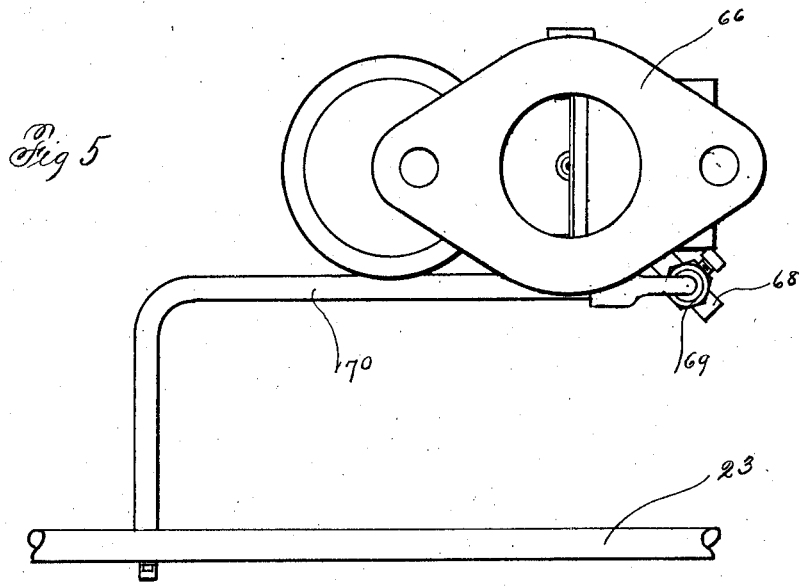
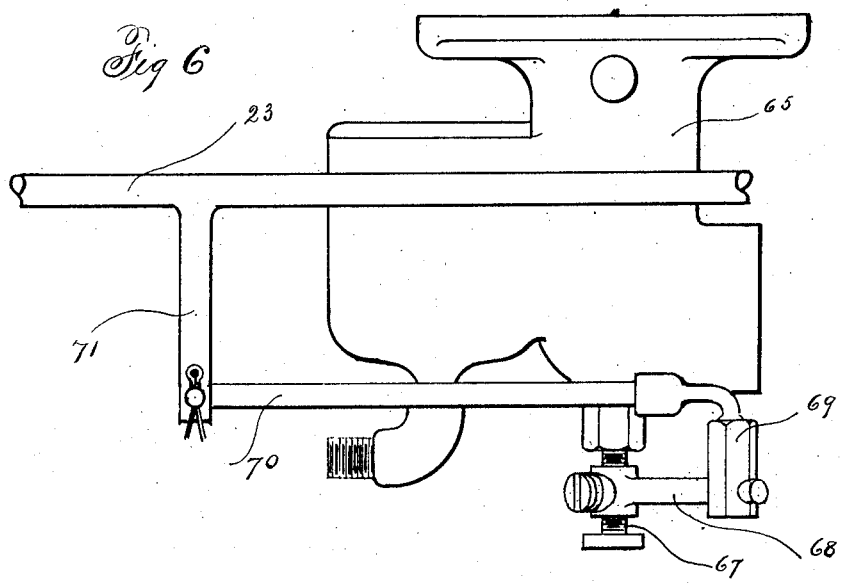
Inventor
Joseph Marion King

UNITED STATES PATENT OFFICE.

JOSEPH MARION KING, OF DETROIT, MICHIGAN.

INTERNAL-COMBUSTION ENGINE.

1,361,072.  Specification of Letters Patent.  Patented Dec. 7, 1920.

Application filed July 15, 1918. Serial No. 245,088.

*To all whom it may concern:*

Be it known that I, JOSEPH MARION KING, a citizen of the United States, residing at Detroit, in the county of Wayne and State of Michigan, have invented new and useful Improvements in Internal-Combustion Engines, of which the following is a specification.

This invention relates to prime movers whose motive force is derived from the expansion of gases of combustible fuel such as hydrocarbons and has for one of its objects the thorough scavenging of the combustion chamber of all expended gases during each exhaust cycle, such prime mover or engine being known as of the four-cycle type.

A further object is to insure a zone of fuel mixture in the firing chamber, free from inert gases, thereby eliminating imperfect propagation of flame, which causes waste of fuel and loss of power; to increase the power of the engine by emptying the firing chamber of burnt gases and refilling it with a pure firing mixture. The final object is to provide means whereby the compression may be manually regulated at any and all times while the engine is in motion; the pressure at the end of the inspiration stroke raised even above atmospheric pressure to any possibly workable pressure, thus raising the mean effective pressure to the very highest possible point, the peculiar cooling means of the construction facilitating the highest practicable pressures for a fuel mixture charge.

The objects narrated are attained by the mechanism illustrated in the accompanying drawings, of which, Figure 1, is a plan view of an internal combustion engine of the four-cylinder type, the detachable head removed, which embodies the invention.

Fig. 3, is a vertical section of an end elevation on the line A—A and also on the line B—B.

Fig. 4, is a broken away vertical section of an end elevation on the line C—C.

Fig. 5, is a plan view illustrating manner in which the fuel valve of a carbureter is movably connected to the rod 23, which actuates the slide-valve 14 that controls the outlet to the engine-cylinder and the escape-port in the fluid chamber.

Fig. 6, is a side elevation of the device shown by Fig. 5.

In the following detailed description of the various parts like numerals will designate like parts throughout the drawings, viz:

Figure 1:
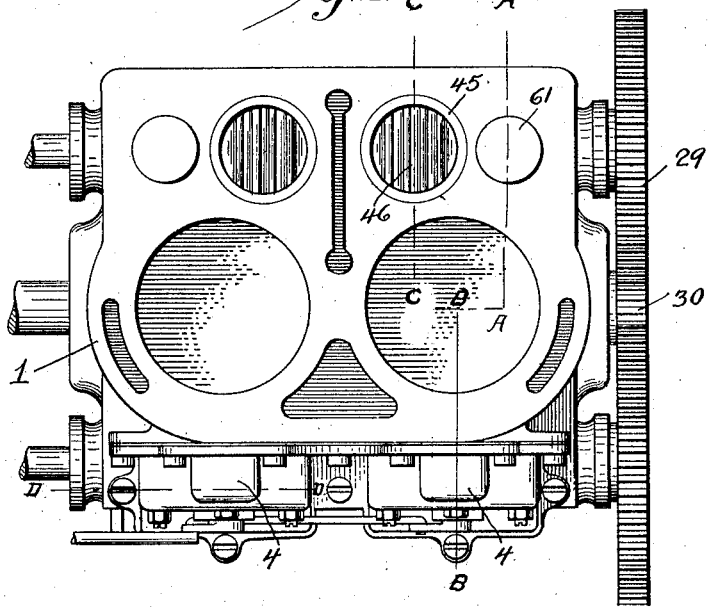
Figure 2:
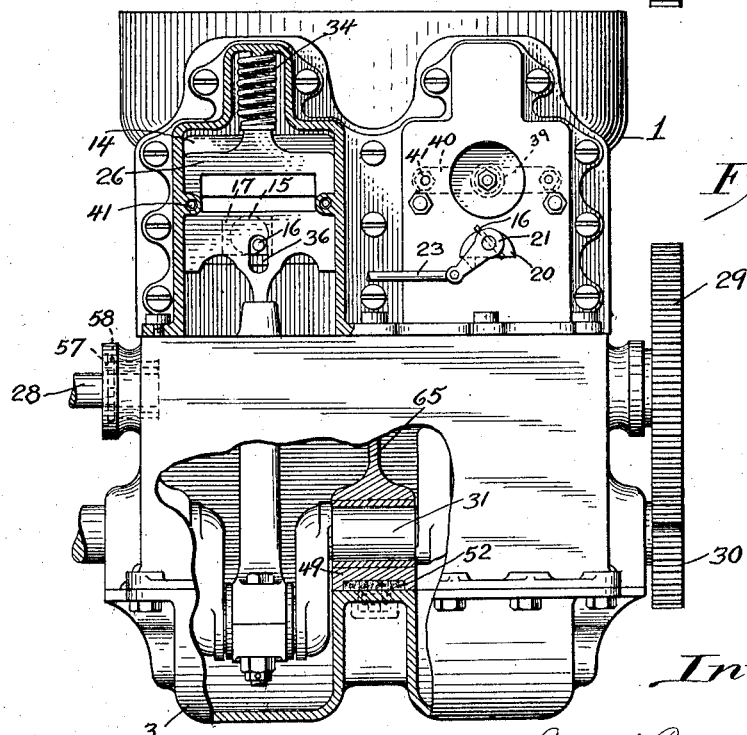
Fig. 2, is a side elevation, showing a section on the line D—D of Fig. 1.

Numeral 1 is cylinder or cylinder wall; 2 is cylinder-block; 3 is crank-case; 4 is wall of an air chamber 5 and is held in fluid-tight relation with the side 8 of engine by means of screw bolts 9; 10 is port hole formed in engine side 8 communicating with opening 11 formed in cylinder wall 1; 12 is also a port hole formed in side 8 opening to outlet 13; 14 is a slide-valve movably related with side 8, utilizing the surface of side 8 as its seat and actuated by a cam 15 on shaft 16 rotatably mounted in side 8, there being a suitably formed opening 17 in slide-valve 14 for the reception of cam 15; a collar 18 on shaft 16 and fitting closely to wall 4 is adapted to hold cam 15 in position; a boss 19 having stops 20, is formed on the exterior or wall 4, one portion of shaft 16 being rotatably mounted in said boss; 21 is a lever rigidly mounted on shaft 16 and is provided with a stop or rest 22, adapted to limit, by contact with stops 20, the movement of lever 21; 23 is a control rod, one end of which is movably mounted in the end of lever 21 and is adapted to co-act with a fuel control of a carbureter or fuel source of engine; 24 is a port hole formed in slide-valve 14 registering at all times with opening 10 in side 8; 25 is also port hole in slide-valve 14 adapted to register with opening 12 and outlet 13 by means of cam 15 manually operated; 26 is a slide-valve movably related with slide-valve 14 and actuated by cam 27 mounted on shaft 28 which is rotated with cog wheel 29, cog wheel 29 being driven by gear 30 on crank shaft 31; 32 is a port hole in slide-valve 26 adapted to alternately register with port holes 24 and 25 of slide-valve 14; 33 is a seat or rest formed on the top of slide-valve 26 for a helical spring 34 adapted to keep the cam-push-rod 35 in constant contact with cam 27; a clearence opening 36 is formed in slide-valve 26 for shaft 16; 37 is an air-intake valve and 38 is its stem, which is slilably mounted in hub 39 of member 40, the said member being rigidly attached to the interior of wall 4 of chamber 5 by screw bolts 41 or other suitable means; the helical spring 42 is adapted to hold, with yielding resistance, air-intake valve 37 against its seat; 43 is an adjusting screw held rigidly in position when set by locknut 44 and is adapted to hold slide-valve 14 and slide-valve 26 and side 8 in fluid-tight relation with each other.

45 is an annular wall whose inside space is partly occupied by transverse members 46 equi-distant to and in staggered relation with each other, the said annular wall being loosely mounted in recess formed in engine portion vertically above the fuel-intake valve seat 47 and held in position by screw not shown or any other suitable means; the loose fit of vaporizing member insures sufficient heat to properly perform its function and prevent soot accumulation on the staggered rods 46, the cooling wall of engine adjacent to the annular wall 45 always acting as a cooling medium to prevent overheating of the vaporizing member, viz., excessive heat in the vaporizing member will cause its wall to expand until it is contiguous to engine wall when it is thereby cooled; vaporization of the fuel is here accomplished by the principle of impingement.

48 is a crank-shaft bearing formed in the cylinder block 2 and 49 is the bearing-cap; 50 is packing recess formed in each end of cap 49, the packing adapted to be tightened when in position by slides 51 which are pressed down in spaces 51 between the said packing and the ends of cap 49; 52 is packing recess formed longitudinally on under surface of cap 49, the packing of which is adapted to be held in place by pressure of crank case 3 or rather the surface of the crank case division-wall that joins to the cylinder block 2, the said crank case and cylinder block being held in fluid-tight relation by screw bolts 53 or other suitable means; 54 are bearing studs and 55 Castle nuts; 56 are recesses formed in crank case division wall over ribs which join crank-case-wall-chambers, such recesses 56 adapted to provide spaces for the castle nuts 55. With this construction each cylinder-crank-case chamber is made practically fluid tight, communicating with chamber 5, and separate from the other.

57 is annular bearing for cam shaft 28 mounted in cam-shaft housing 62; 58 is recess formed in housing 62 for the reception of packing, against which the rim of bearing 57 is adapted to press to form a liquid-tight joint, the said bearing 57 being held in position by a set screw not shown or other suitable means.

59 is cam which actuates intake valve of engine; 60 is cam which actuates exhaust valve of engine; 61 is exhaust valve; 63 is a boss or protuberated portion on the interior of wall 4, in which threaded opening is made for the reception of adjusting-screw 43; 64 is piston.

65 is a carbureter having a flange 66 adapted to engage the intake port of an engine; 67 is the fuel valve-stem of the carbureter on which is adjustably mounted an arm 68; 69 is a universal joint adjustably attached to arm 68; 70 is a link connecting the universal joint 69 with a dependent portion 71 of control rod 23 which actuates slide-valve 14.

It is observable that the control rod 23 regulates the amount of air entering the cylinder from the fluid chamber, that as the quantity is varied so should also the quantity of fuel be varied in uniform proportion. Therefore by causing the fuel valve of the carbureter to co-act with the control rod that limits the supply of the supercharge of air to the cylinder, the uniform proportion of air and fuel fixed by the initial setting of the fuel valve is maintained throughout the range of air quantities supplied to the cylinder.

The principle of operation is as follows:

The piston 64 (see Fig. 4) has just completed the intake stroke; note position of cam 59, the intake valve being closed; the compression stroke now begins and when completed, cam 27 (see Fig. 3) will have rotated through ninety degrees and lifted slide-valve 26 so that port hole 25, of slide-valve 14, which communicates with outlet 13, will be closed, and port hole 24, of slide-valve 14 will be uncovered, thus permitting communication between chamber 5 and cylinder 1 via inlet or opening 11. The slide-valves will remain in this position until the firing stroke of piston has been completed. It will be noted that the upward strokes of piston always fill the crank case with air drawn in through valve 37 and in certain positions of slide-valves, through port 12 of side 8. Whenever port 12 remains closed during the downward stroke the air in the crank case chamber is compressed. While cam 15 which controls position of slide-valve 14 remains in position shown in Fig. 3, port 25 registers with port 12 of side 8, thus providing an escape for the air in the crank case chamber when the inspiration stroke occurs.

When the piston on the firing stroke has descended to a point where the top of the piston has reached the top edge of opening 11 in cylinder, cam 60 will begin to open exhaust valve 61, and then while the port 11 remains unclosed or uncovered by piston the air in the crank case which is under pressure will flow through port 32 of slide-valve 26, through port 24 of slide-valve 14 and through port 10 of side 8 to cylinder through opening 11 in cylinder wall and drive out the expended gases leaving in the firing chamber, after completion of the exhaust cycle pure air.

To increase the compression of the engine, the control 23 which determines the position of cam 15 may be connected so as to co-act with the fuel control or may be manipulated independently of such combination from the dash of motor car. If the control is pushed forward until the lever 21 moves through an arc of ninety degrees, slide-valve 14 will descend and completely cover port 12 of side 8, and port 24 of slide-valve 14 will continuously register with port 32 of slide-valve 26, thus preventing the escape of the air drawn in through valve 37 and forcing same in to the cylinder on each downward stroke of piston. Should the lever 21 be moved from the position shown in the drawing through forty-five degrees the port holes referred to would be in such relation to each other as would permit one half of the air drawn into the crank case to escape on the downward, inspirating stroke of the piston, through port 25 of slide-valve 14, while one half of the volume of air would be forced into the cylinder through port 24 and would be compressed with the fuel charge. In the manner described the compression may be fixed at any desirable pressure.

Having described the invention in detail, refererring to the various parts and combination thereof, and explained the principle of operation, so that any one skilled in the art to which the invention appertains may by reference to the accompanying drawings and specification construct and produce the same, I wish it understood that the drawings shown are merely illustrative and that modifications may be made in the construction and arrangement of the various parts to adapt the invention to specific uses without departing from the essentials of the device as comprehended in the appended claims.

What I claim as new, is:

1. In an internal combustion engine of the four-cycle type, the combination of a fluid chamber having a valvular inlet, an outlet to the interior of the cylinder, means to compress fluid in said chamber, a control to limit or close said outlet and means coacting with said control to regulate the flow of fuel from a carbureter or other fuel-supply of the engine.

2. In an internal combustion engine of the four-cycle type, the combination of an air chamber having a valvular inlet, a controlled outlet to interior of engine's cylinder, a controlled air-escape port, means to compress air in said chamber and a member actuated manually to uncover said outlet and close said port during period of fluid-fuel intake stroke.

3. In an internal combustion engine of the four-cycle type, the combination of an air chamber having a valvular inlet, a controlled outlet to interior of engine's cylinder, a controlled air-escape port, means to compress air in said chamber, a member actuated by motion of said engine and a member actuated manually to jointly regulate the quantity of air flow from said chamber to said outlet and from said port during fluid-fuel intake stroke.

4. In an internal combustion engine of the four-cycle type, the combination of an air chamber having a valvular intake, a controlled outlet to interior of engine's cylinder, a controlled air-escape port, means to compress air in said chamber, means to admit air to said outlet and to close said port during period of exhaust stroke and means to regulate quantity of air flow to said outlet and from said port during period of fluid-fuel intake stroke.

JOSEPH MARION KING.